Feb. 8, 1949. D. T. MITCHELL 2,461,389
LABORATORY CIRCULATING EVAPORATOR
Filed Feb. 23, 1945

David T. Mitchell
INVENTOR.
BY

Patented Feb. 8, 1949

2,461,389

UNITED STATES PATENT OFFICE 2,461,389

LABORATORY CIRCULATING EVAPORATOR

David T. Mitchell, Decatur, Ill.

Application February 23, 1945, Serial No. 579,443

1 Claim. (Cl. 122—406)

This invention relates to improvements in laboratory evaporators in which the liquid or solution being evaporated is continuously circulated first through a heat exchanger and second through a chamber that permits separation of vapor from liquid. More specifically, it relates to improvements in such laboratory evaporators that are designed to operate under reduced pressure, and whose surfaces in contact with the liquid being evaporated consist of glass or similar thermoplastic chemically resistant material.

The objects of this invention are to provide an evaporator that, one, is simple compact and efficient, two, reduces entrainment due to foaming, spraying, and other causes, three, practically eliminates explosive ebullition due to superheating of liquid, four, prevents crusting of solids that separate from solution during the evaporation and consequent damage to those solids if they are sensitive to heat, five, is easily charged and discharged, six, can be cleaned without being disassembled, and seven, is easily assembled and disassambled.

The foregoing objects are attained by means of an improved evaporator illustrated in the accompanying drawing in which.

Figure 3:
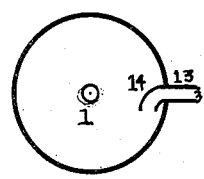
Figure 3 is a horizontal section of the vapor separator along the line 24—24 of Figure 1.

To operate the evaporator, vacuum is applied to tube 15 and liquid is drawn into the apparatus through tube 5 and open valve 6 until vapor chamber 1 is about one-half full of liquid, at which point valve 6 is closed. Liquid now fills liquor return tubes 2, 3, 4 and all of the heat exchanger tube assembly 7—9—10—10—10—11— 12 to the same level as it is in chamber 1. The applied vacuum is allowed to reach a maximum, or it is brought to some predetermined value if a pressure regulator, not shown, is used. Steam is then admitted through tube 18 to the inside of the heat exchanger jacket 17 and exhausted, with condensate and excess steam, through tube 19. If hot water or other heating liquid is used, it can, if desired, be admitted through tube 19 and discharged through tube 18 so as to provide a flow that is parallel to the flow of liquid inside the heat exchanger tubes 10—10—10. No positive steam pressure in the jacket is required for evaporation of aqueous solutions under reduced pressure. The liquid in the heat exchanger tube assembly within the jacket comes rapidly to a boil and, rising as a mixture of vapor and liquid, emerges into the vapor separator chamber 1 by passing through tube extensions 12—13—14. Tub extension 14 is bent to one side and slightly downward, as shown in Figure 3, so as to direct spray away from the vapor exit tube 15 and to produce a whirling motion of the liquid and vapor in chamber 1. As the mixture of vapor and liquid rises in the heat exchanger tube assembly, liquid enters from below through tube 4, tube 7, and chamber 9 owing to the hydrostatic head of liquid in chamber 1 and in tube extensions 2 and 3. Circulation, down through tube extensions 2 and 3 and up through the heat exchanger tube assembly, continues so long as there is sufficient head of liquid in chamber 1 and tube extensions 2 and 3 to support a column of mixed vapor and liquid extending high enough in tube 13 to overflow into chamber 1. Vapor passes off through tube 15 and may be disposed of in various ways. It may be condensed on a cold solid surface, or in a cool liquid, or it may be led directly to a steam jet aspirator or to a vacuum pump that will handle uncondensed vapor.

Additional liquid can be admitted to the system through valve 6, intermittently or continuously as desired, to compensate for material removed as vapor. This addition can be continued until increasing viscosity of the concentrated solution or accumulation of precipitated solids interferes with circulation. Continuous evaporation of a dilute solution to a given concentration can also be conducted with this evaporator. To do this, the charge in the evaporator is first brought to the desired concentration, then some of the charge is drawn off continuously under vacuum through a T-connection in return tube 3 (not shown) while fresh dilute solution is fed in continuously through inlet tube 5. Rates of feed and withdrawal of concentrated solution must be adjusted to the capacity of the evaporator.

The charge in the evaporator can be easily removed by admitting air to the apparatus at some point above the liquor level, as, for example, through tube 15, and then opening valve 6 when the inside air pressure equals the outside pressure. The charge will then flow out through tube 5 under its own weight. Drainage is rapid and complete except for a small proportion of material adhering to the tube and chamber walls.

Such adhering material is easily flushed out by closing valve 6, renewing the vacuum, slowly drawing in through tube 5 and partly opened valve 6 enough water to fill chamber 9 about half full, disconnecting tube 5 from the source of water, and then suddenly, but only momentarily, opening valve 6 completely. The sudden inrush of air sprays water throughout the apparatus without causing any entrainment through tube 15. The wash water can then be drained out by releasing the vacuum and opening valve 6. This washing operation, which uses a volume of water that is quite small in proportion to the volume of a full charge, can be repeated as often as required.

Aside from the heat exchanger jacket 17 and its associated parts, the evaporator consists of only three integral parts connected together with air-tight connectors 20—21—22. These connectors may be rubber sleeves, such as short sections of appropriate size rubber tubing, in which case the ends of the connected tubes are butted closely together, or they may consist of ground glass joints, preferably the standard ball and socket type. This construction permits rapid assembly and disassembly of the apparatus. The three integral parts of the evaporator referred to above are, one, the vapor separator consisting of chamber 1 and rigidly connected tubes 2, 15, and 13—14, two, the combined liquid return and inlet-outlet tube consisting of tube 4 with long bent arm 3 and attached valve or stopcock 6 and tube 5, and, three, the heat exchanger tube assembly consisting of inlet tube 7, manifold chamber 9, tubes 10—10—10, manifold chamber 11 and outlet tube 12.

Because of its ease of fabrication and resistance to attack by chemicals, glass is the preferred material of construction for those parts of the evaporator that come into contact with the liquid being evaporated. Any other chemically resistant thermoplastic material, however, that can be worked like glass and has sufficient mechanical strength at 100° C. can be used in place of glass.

The heat exchanger jacket and it associated parts, except gasket 27, are preferably constructed of metal such as copper, brass, bronze, or stainless steel, although glass can be used here as well. An integral all-glass heat exchanger, consisting of tube assembly and jacket can be constructed if desired.

The vapor separator consisting of chamber 1 and tubes 2—13—14—15 is conveniently prepared from a round bottom flask by replacing the neck of the flask with tube 15, blowing a hole in the bottom of the flask and sealing on tube 2, and blowing another hole in the upper part of the flask and inserting combined tubes 13—14. Tubes 13 and 14 are preferably joined and attached to the flask wall by means of a ring seal. Other methods of inserting combined tubes 13 and 14 may be used, however. For example, if rubber in contact with the evaporated liquid can be tolerated, the ring seal can be replaced with a short flared glass nipple which will accommodate a rubber stopper bored to fit tube 13. In this case a single tube properly bent can be used to convey the mixture of vapor and liquid from tube 12 into chamber 1.

The combined liquid return and inlet-outlet tube assembly, consisting of bent tube 3 sealed to tube 4 whose upper end joins with lower end of tube 7 and whose lower end terminates in valve 6 and nipple 5, is conveniently prepared from standard glass tubing and a glass stopcock. If, again, contact of rubber with the liquid being evaporated can be tolerated, valve 6 may consist of a screw clamp on a short section of thick walled rubber tubing instead of a glass stopcock.

Figure 2:
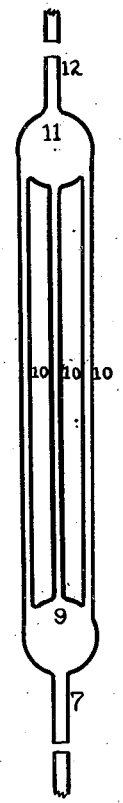
Figure 2 is a vertical section of the heat exchanger tube assembly.

The heat exchanger tube assembly is conveniently made out of standard glass tubing and two round bottom flasks that are small with respect to chamber 1. Holes are blown in the bottoms of the flasks and lengths of glass tubing are sealed thereon as illustrated in Figure 2. If the necks of the flasks, devoid of rim, are not long enough to project through the packing glands 8—16 on the ends of the heat exchanger jacket and provide proper connections with tubes 4 and 13, or if they are of improper diameter, they can be cut off and replaced with suitable lengths of proper sized glass tubing. Although only three heat exchanger tubes are illustrated in the drawing, more may be used if desired. Five 10 mm. outside diameter tubes can be easily arranged on the body of a 100 ml. round bottom glass flask; one tube is centered on the bottom of the flask and the remaining four are spaced ninety degrees apart on a circle near the flask's equator. Still more tubes, arranged in one or more circles of attachment points, can be sealed to larger flasks.

The heat exchanger jacket 17 can be made as follows: A cylinder is made out of thin sheet metal or one is cut from metal tubing if tubing of proper size and appropriate wall thickness is available. A sheet metal end plate 25 carrying a centered hole slightly larger than tube 7 is brazed flush with one end of the jacket. The gland body 8 of packing gland 8—30 is then centered over the hole in end plate 25 and soldered to the plate. A sheet metal flange 26 carrying six bolt holes to accommodate bolts 23 spaced sixty degrees apart is soldered flush with the other end of jacket 17. Another sheet metal end plate 28 is cut to the same diameter as flange 26. Bolt holes corresponding to those in flange 26 are drilled in this plate, also a center hole slightly larger than tube 12. The gland body 16 of packing gland 16—29 is centered over the center hole in the plate and is then soldered in place. Holes providing a snug fit for tubes 18 and 19 are drilled near the ends of jacket 17, and short metal nipples are inserted therein and soldered in place. The packing glands 8—30 and 16—29, and the gasket 26, which may be any compressible material that will withstand water and steam at 100° C., provide for steam and watertight connections around the heat exchanger tube assembly. One end plate of the jacket has to be removable in order to allow assembling and disassembling of the heat exchanger.

It is not essential to this invention that the heat exchanger jacket be constructed of metal. Any means for covering the heat exchanger tube assembly so that a heating fluid can be circulated over its outside surfaces will do. For example, a glass jacket similar to the jacket on laboratory straight tube condensers, with inlet and outlet tubes near its ends, can be attached to tubes 7 and 12 with ring seals. This provides a very satisfactory and compact heat exchanger, but requires considerable glass blowing skill in its construction.

The use of a metal heat exchanger jacket and packing glands, as illustrated in the drawing, precludes the convenient use of ground glass joints for connecting the heat exchanger to the other parts of the evaporator. This is so because the packing gland followers 29—30 will not slip over the expanded parts of the glass joint. Short joint nipples can be sealed to the tubes extending past the packing glands after the jacket is assembled, but this unduly lengthens the heat exchanger. Ground glass joints, especially the standard ball and socket type, are conveniently and advantageously used on the heat exchanger when it is equipped with the foregoing described all glass jacket. A ground glass joint can be used to connect the vapor separator with the liquid return tube regardless of the construction of the heat exchanger jacket.

It is not essential that chambers 9 and 11 in the heat exchanger tube assembly be constructed of round bottom glass flasks, or that they be spherical in shape. They may, if it is so desired, consist of irregularly shaped large or small bulbs blown on, or attached to, the ends of the inlet and outlet tubes 7 and 12, respectively. The essential features of the heat exchanger tube assembly are, one, that it shall be a unitary integral structure; two, that it shall comprise, in combination, an inlet tube with an expanded chamber attached at one end, an outlet tube with a similar expanded chamber at one end, and a plurality of tubes connecting the two expanded chambers; and, three, that the assembly be constructed of glass or similar chemically resistant thermoplastic material. It is desirable, though not essential, that the inlet and outlet tubes be in about the same straight line with the connecting tubes parallel thereto.

Figure 1:
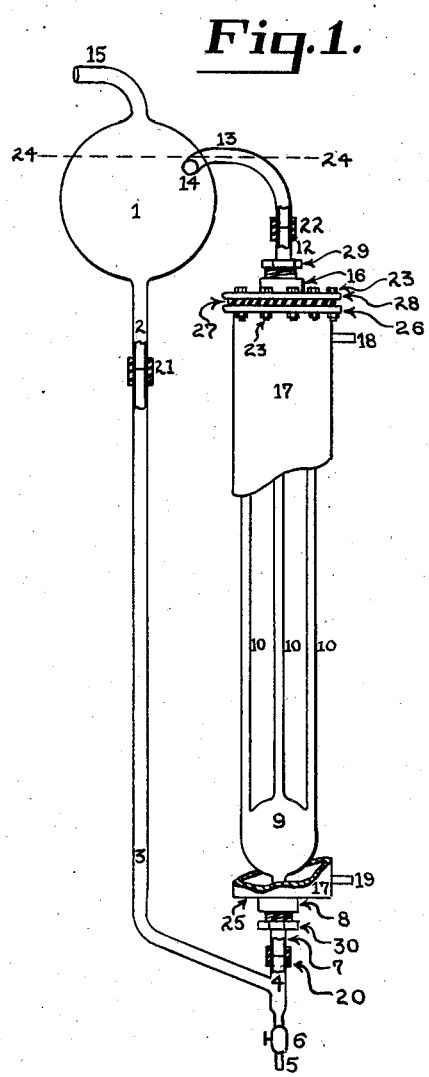
Figure 1 is a perspective view of the entire evaporator with a cut-away section of the heat exchanger jacket. Such accessories as supports, condenser, condensate receiver, vacuum pump, and lines for conveying heating fluid to and from the heat exchanger are not shown.

Another important feature of this invention is the design of the vapor separator. It has previously been proposed to convey the mixture of vapor and liquid emerging form the heat exchanger into the vapor chamber 1 with a tube entering the upper part of the chamber and sealed flush with the chamber wall. When this is done, there occurs much entrainment of liquid through the exit vapor tube 15, owing to pronounced creeping of liquid along the chamber wall between tubes 13 and 15. Although most of the entering mixture of vapor and liquid plunges directly into the chamber, a considerable proportion of it fans out along the chamber wall in all directions from the tube entrance. To overcome this difficulty, it has been suggested that tube 13 extend a short distance into the chamber, rather than stop flush with the wall. This reduces the entrainment somewhat, but does not eliminate it altogether, because the entering stream of liquid and vapor strikes the opposite wall of the chamber with considerable force and again splashes and fans out enough to create considerable entrainment. By bending the tube extension within the chamber fairly sharply to one side, and slightly downward, forming tube 14 as shown in Figures 1 and 2 of the accompanying drawing, all previous difficulties with entrainment are overcome. The entering stream of vapor and liquid, now having tangential instead of radial motion, does not impinge violently against the chamber wall and fan out as it did before. Instead, it creates a smooth rapid whirling motion of the liquid and vapor in the chamber that eliminates all former entrainment. There is now no creeping or fanning out of liquid along the chamber walls toward the exit vapor tube, and the whirling motion of the vapor develops enough centrifugal force to throw all but the finest droplets of spray against the sides of the chamber where they drain down to the liquid charge below. Furthermore, the whirling motion of the entering stream of vapor and liquid, as well as that of the main charge of liquid in the chamber, breaks down all but the most persistent types of foam that may develop during the evaporation. Many foams that cause serious entrainment in conventional laboratory evaporators, whether of the circulating or non-circulating type, are immediately dispersed in the vapor separator of my evaporator.

It is not essential that the vapor separator chamber 1 be spherical in shape, or that the vapor exit tube 15 be centered at its top, or the liquid return tube 2 centered at its bottom, or that the vapor-liquid inlet tube 13 enter the top part of the chamber. Tubes 2 and 15 can be off center; tube 13 can enter chamber 1 midway between its top and bottom, or even at its lower portion, and the bottom of chamber 1 can be drawn out to a pear shape if desired. The vapor separator chamber may be cylindrical in shape. The three essential features of the vapor separator are, one, its horizontal cross section shall be essentially circular so as not to impede the circular motion of the liquid and vapor therein; two, the extension of the vapor-liquid inlet tube inside the chamber shall be bent sideways as shown in Figure 2 so as to initiate the desired whirling motion of the charge and; three, it shall be constructed of glass or similar chemically resistant thermoplastic material.

Still another feature of the invention is the design of combined bent tube 3 and tube 4 that serves both as a means for returning liquid from the vapor separator to the heat exchanger and as a means for charging and discharging the evaporator. Tube 4, which is a straight line extension of tube 7, the inlet tube for the heat exchanger tube assembly, permits admission of fresh liquid to the evaporator while it is operating without causing any of the admitted liquor to back up into the vapor separator and interrupt circulation. The upward slanting arm of tube 3 facilitates drainage. Preferably the acute angle between tube 4 and the slanting arm of tube 3 should be forty-five degrees or less.

There are no rigid limitations on the sizes and lengths of the tubes used to connect the vapor separator with the heat exchanger and to lead vapor away from the vapor separator. It is advisable, however, that the cross sectional area of the vapor outlet tube and of the tube leading from the top of the heat exchanger to the vapor separator be not less than the combined cross sectional area of the heat exchanger tubes; otherwise very high vapor velocities, with accompanying undesirable pressure drops, will occur.

If uneven ebullition indicative of liquor superheating does occur in the circulating evaporator, it can immediately be eliminated by admitting a small stream of air bubbles into the circulating liquid at a point below the seat exchanger so that the bubbles rise through the heat exchanger tube or tubes.

The following directions and specifications as to dimensions and materials of construction refer to a specific example of an evaporator contemplated by this invention.

*Heat exchanger tube unit.*—Five pieces of "Pyrex" glass tubing having an outside diameter of 10 mm. and an inside diameter of 8 mm. are sealed between the bottoms of two 100 ml. round bottom "Pyrex" glass flasks whose necks have been cut off close to the spherical bodies. The neck of each flask is replaced with a 4 inch length of "Pyrex" glass tubing having an inside diameter of 18 mm. and an outside diameter of 22 mm. One of the 10 mm. connecting tubes, 18 inches long, is sealed to the edges of appropriate holes blown in the centers of the bottoms of the 100 ml.

flasks. The other four tubes, about 20 inches long, are sealed to the edges of appropriate holes blown at points 90 degrees apart on circles near the equators of the flask bodies. Entire length of the heat exchanger tube unit is about 32 inches.

*Heat exchanger jacket.*—A rectangular piece of 16 gage copper sheet 24 inches long and 11 inches wide is rolled into a cylinder having an inside diameter of slightly more than 3 inches, and the abutting long edges are soldered together. A circular plate fitting snugly and flush within one end of the cylinder and carrying a centered hole one inch in diameter is cut from copper plate 0.25 inch thick and soldered in place. The gland body of a conventional packing gland adapted to receive the 22 mm. (⅞ inch) outside diameter end tube of the heat exchanger tube assembly is centered over the hole in the foregoing jacket end plate and soldered in place. A circular flange with an outside diameter of 4.5 inches and an inside diameter such that the flange fits snugly over the other end of the jacket is cut from 0.25 inch thick copper plate, drilled to take six $\frac{3}{16}$ inch bolts spaced 60 degrees apart on a 3.5 inch circle, and soldered flush with the end of the cylinder. Another end plate, 4.5 inches in diameter, is cut from the 0.25 inch thick copper plate. Both holes corresponding to those in the foregoing flange are drilled in it, also a center hole one inch in diameter. A gland body, adapted to receive the ⅞ inch outside diameter end tube of the heat exchanger tube assembly, is centered over the center hole in the larger end plate and soldered in place. One quarter inch holes are drilled one inch from the top of the jacket and 0.5 inch from the bottom, and over these are soldered 2 inch nipples of 0.25 inch copper tubing to serve as steam inlet and condensate outlet.

*Vapor separator.*—The neck of a standard short neck round bottom 5 liter "Pyrex" glass flask is cut off close to the body of the flask. The remaining attached short section of neck is appropriately constricted, and to it is sealed an eight inch length of "Pyrex" glass tubing having an inside diameter of 21 mm. and an outside diameter of 25 mm. The attached tube is then given a gradual 90 degree bend to provide the vapor exit tube 15 shown in Figure 1. An appropriate hole is blown in the bottom of the flask, diametrically opposite the vapor outlet, and to it is sealed a 4 inch nipple of "Pyrex" glass tubing having an inside diameter of 18 mm. and an outside diameter of 22 mm. This provides tube 2, a part of the liquid return line, as shown in Figure 1. Another appropriate hole is blown in the flask at a point about 45 degrees from the top, as measured on a meridian, and through this hole is inserted a portion of a section of glass tubing about one foot in length having an inside diameter of 18 mm. and an outside diameter of 22 mm. This section of glass tubing is bent before insertion in such a manner that that portion inside the flask bends sideways and slightly downward as shown in Figures 1 and 3. The tube and flask are then fused together to make one integral part so that the tube forms one continuous open passage through the wall of the flask and into the flask. The portion of the tube attached to the outside of the flask is then bent downward in a gradual 90 degree curve starting a short distance away from the flask, so that the center line of the downward pointing vertical portion measures about 7 inches from the vertical center line of the flask. All except about one inch of the straight vertical part of the downward pointing tube is then cut off. This provides tube 13 as shown in Figure 1.

Combined liquid return and inlet-outlet tube: An appropriate hole is blown in the side and middle of a 6 inch straight length of "Pyrex" glass tubing of the same size as that attached to the bottom of the vapor separator. To the edges of this hole, and at an angle of about 45 degrees with the 6 inch tube, there is sealed a 32 inch length of the same glass tubing. At a point on the longer tube about 10 inches from its attachment to the short tube, the tube is softened by heating and bent in a gradual curve so that the longer arm of the bent tube lies in the same plane with the 6 inch tube and parallels it at a center to center distance of about 7 inches.

*Assembling the heat exchanger.*—End tube 7 of the heat exchanger tube assembly is thrust into the open end of the heat exchanger jacket and through the hole in the far end plate 25 as far as it will readily go. The free larger end plate 28 carrying an annular rubber gasket 27 with matching bolt holes is then slipped over the tube at the opposite end of the tube assembly and bolted into place on the flanged end of the jacket, using short stove bolts. String packing is placed in the packing glands 8—16, and it is held in place by followers 29—30 that make threaded connections with the gland bodies. The end tubes of the assembly extend about 1.5 inches beyond the packing glands.

*Assembling the evaporator.*—The assembled heat exchanger is mounted in a vertical position on suitable supports by means of clamps affixed to the jacket. The lower end of the tube assembly preferably should lie 18 inches or more above the platform, table, or floor supporting the evaporator so that vessels can be manipulated beneath the evaporator inlet-outlet tube 5 whose lower end falls 6 inches below the lower end of the heat exchanger. The free end of the liquid-vapor inlet tube 13 on the vapor separator is then attached to the upper end tube of the heat exchanger 12 by means of a 2 inch section of firmly fitting thick walled rubber tubing 22, and is held firmly in place in a vertical position by means of clamps attached to the vapor exit tube 15 and to the liquid return tube 2. The combined liquid return and inlet-outlet tube 3—4 is then put in place, as shown in Figure 1, to test its fit. If it fits, connections are made with the vapor separator and heat exchanger using short sections of appropriate thick walled rubber tubing 20—21. If it does not fit at first, alterations as to length of the long parallel arm and distance between the parallel arms are made until it does fit.

Having thus decribed my invention, I claim:

A laboratory circulating evaporator of the class described comprising in combination: an integral heat exchanger tube assembly comprising two manifold chambers, a plurality of tubes connecting said manifold chambers, an inlet tube connected to one manifold chamber, and an outlet tube connected to the other manifold chamber, said tube assembly providing for flow of the liquid being evaporated, and vapors thereof, on the inside of its tubes and manifold chambers; an integral vapor separator assembly comprising a chamber whose horizontal cross section is substantially circular, a vapor outlet tube connected to the top of said chamber, a liquid outlet tube connected to the bottom of said chamber, an inlet tube for mixed vapor and liquid connected to the chamber at a position between its top and bottom, said inlet tube protruding inwardly through the wall of said chamber for a short distance and directed toward an adjacent part of the chamber wall, whereby the incoming stream of mixed vapor and liquid is delivered tangentially against the chamber wall and imparts a smooth whirling motion to the vapor and liquid within said chamber; an integral tube assembly that provides combined improved means for charging, discharging, and washing the evaporator, and for returning liquid from the vapor separator assembly to the inlet tube of the heat exchanger tube assembly, said tube assembly comprising a straight tube with an opening in its wall, and a bent tube consisting of a bend and two substantially straight arms, the end of one of said arms being sealed to the rim of the opening in said straight tube so that said attached arm and said straight tube form an acute angle, the other of said arms lying in the same plane with said straight tube and being parallel thereto; means for heating the outer surface of said heat exchanger tube assembly; means for connecting the outlet tube of the heat exchanger tube assembly to the mixed vapor-liquid inlet tube of the vapor separator assembly; means for connecting the liquid outlet tube of the vapor separator assembly to the combined liquid-return charge-discharge tube assembly; and means for connecting said combined tube assembly to the inlet tube of the heat exchanger tube assembly.

DAVID T. MITCHELL.

REFERENCES CITED

The following references are of record in the file of this patent:

UNITED STATES PATENTS

| Number | Name | Date |
|---|---|---|
| 686,530 | Ostergren | Nov. 12, 1901 |
| 984,265 | Dinckels | Feb. 14, 1911 |
| 1,024,641 | Mackie | Apr. 30, 1912 |
| 1,568,413 | Peebles | Jan. 5, 1926 |
| 1,609,614 | Foilla | Dec. 7, 1926 |
| 1,735,979 | Sadtler | Nov. 19, 1929 |
| 2,100,095 | Wilson et al. | Nov. 23, 1937 |
| 2,288,245 | Kopp | June 30, 1942 |
| 2,391,244 | Jackson | Dec. 18, 1945 |